(12) United States Patent
Wu et al.

(10) Patent No.: US 11,902,433 B1
(45) Date of Patent: Feb. 13, 2024

(54) ASSURED INTERNETWORKING PROTOCOL PERFORMANCE ENHANCING PROXY

(71) Applicant: Architecture Technology Corporation

(72) Inventors: John Wu, Eden Prairie, MN (US);
Ranga S. Ramanujan, Medina, MN (US)

(*) Notice: Subject to any disclaimer, the term of this patent is extended or adjusted under 35 U.S.C. 154(b) by 942 days.

(21) Appl. No.: 16/115,709

(22) Filed: Aug. 29, 2018

(51) Int. Cl.
*H04L 9/08* (2006.01)
*H04L 9/40* (2022.01)

(52) U.S. Cl.
CPC .......... *H04L 9/0866* (2013.01); *H04L 9/0819* (2013.01); *H04L 63/0236* (2013.01); *H04L 63/0245* (2013.01)

(58) Field of Classification Search
CPC . H04L 9/0866; H04L 9/0819; H04L 63/0236; H04L 63/0245
See application file for complete search history.

(56) References Cited

U.S. PATENT DOCUMENTS

| | | | |
|---|---|---|---|
| 8,429,232 B1* | 4/2013 | Appenzeller | H04L 51/063 709/206 |
| 8,862,871 B2 | 10/2014 | Ramanujan | |
| 10,348,767 B1* | 7/2019 | Lee | H04L 63/0236 |
| 2012/0265984 A1* | 10/2012 | Ramanujan | H04L 63/12 713/176 |
| 2015/0256517 A1* | 9/2015 | Yan | H04L 63/0428 713/171 |
| 2019/0109848 A1* | 4/2019 | Clark | H04L 9/3228 |
| 2020/0213839 A1* | 7/2020 | Truchan | H04W 12/0013 |

OTHER PUBLICATIONS

Chun-I, Fan, Yi-Fan Tseng, Chih-Wen Lin. Attribute-Based Encryption from Identity-Based Encryption. Journal of LaTEX, vol. NQ, Sep. 2016 (Year: 2016).*
Amir, et al., IBE Extension for Hip, Scitepress, pp. 1-9, 2013, Finland.
AMir, K.C., Trusted Hosts in Host Identiy Protocol (HIP), Metropolia, pp. 1-59, May 22, 2012, Helsinki, Finland.
Maskowitz, et al., Host Identity Protocol Version 2 (HIPv2), Internet Engineering Task Force, pp. 1-128, Apr. 2015, USA.
Melen, et al., Host Identity Protocol-based Mobile Proxy, Network Working Group, pp. 1-13, Aug. 20, 2009, USA.

* cited by examiner

*Primary Examiner* — Lynn D Feild
*Assistant Examiner* — Vladimir I Gavrilenko
(74) *Attorney, Agent, or Firm* — Carlson, Caspers, Vandenburgh & Lindquist, P.A.

(57) ABSTRACT

Embodiments for a networking device are disclosed. The networking device includes a private identity-based cryptographic (IBC) key issued for a first device. The networking device can receive an internet protocol (IP) packet from the first device. The networking device modifies the IP packet to form a modified IP packet, wherein modify the IP packet includes add an extension header to the IP packet. The extension header includes a source identifier identifying the first device, an indication of the key generation authority and an indication of an identity-based encryption (IBE) algorithm. The networking device also generates an identity-based signature (IBS) using the IBC algorithm with the source identifier as an identity input, the modified IP packet as a message input, and the private IBC key for the first device as a private key input. The modified IP packet and the IBS is then sent towards a destination of the IP packet.

23 Claims, 5 Drawing Sheets

ASSURED INTERNETWORKING PROTOCOL PERFORMANCE ENHANCING PROXY

GOVERNMENT CONTRACTS

This invention was made with government support under contract FA8750-18-C-0059 awarded by the Air Force Research Lab (AFRL). The government may have certain rights in the invention.

BACKGROUND

The internet protocol (IP) is the principal communication protocol used throughout the Internet as well as in local networks throughout the world. It has many benefits. IP, however, is vulnerable to hostile attacks. Such attacks can limit the ability of devices to communicate across an IP network. There is a need to mitigate such attacks and enable more secure communication across IP networks.

DRAWINGS

Understanding that the drawings depict only exemplary embodiments and are not therefore to be considered limiting in scope, the exemplary embodiments will be described with additional specificity and detail through the use of the accompanying drawings, in which.

BRIEF DESCRIPTION

Embodiments for a networking device are disclosed. The networking device includes one or more device side network interfaces, one or more network side network interfaces, and one or more processing devices coupled to the one or more device side network interfaces and the one or more network side network interfaces. The networking devices also includes a private identity-based cryptographic (IBC) key issued for a first device by a key generation authority, the IBC key accessible to the one or more processing devices. A storage media is included which is coupled to the one or more processing devices. The storage media includes instructions which, when executed by the one or more processing devices, cause the one or more processing devices to receive, at a first device side network interface of the one or more device side network interfaces, an internet protocol (IP) packet from the first device. The instructions also modify the IP packet to form a modified IP packet, wherein modify the IP packet includes adding an extension header to the IP packet. The extension header includes a source identifier identifying the first device, an indication of the key generation authority and an indication of an identity-based encryption (IBE) algorithm. The instructions also generate an identity-based signature (IBS) using the IBC algorithm with the source identifier as an identity input, the modified IP packet as a message input, and the private IBC key for the first device as a private key input. The modified IP packet and the IBS is then sent from at least one of the one or more network side network interfaces towards a destination of the IP packet.

Embodiments for another networking device are also disclosed. The networking device includes one or more device side network interfaces, one or more network side network interfaces, and one or more processing devices coupled to the one or more device side network interfaces and the one or more network side network interfaces. A storage media is coupled to the one or more processing devices. The storage media includes instructions which, when executed by the one or more processing devices, cause the one or more processing devices to receive an internet protocol (IP) packet at a first network side network interface of the one or more network side network interfaces, the IP packet indicating a second device as a destination. The instructions also determine whether the IP packet has a valid identity-based signature (IBS) by determining if an IBS included with the IP packet corresponds to a source identifier, an indication of a key generation authority, and an indication of an identity-based cryptographic (IBC) algorithm included in an extension header of the IP packet. If the IP packet does not have a valid IBS, the IP packet is discarded. If the IP packet has a valid IBS, the IP packet is processed for forwarding to the second device.

Embodiments for a method for authenticated communication are also disclosed. The method includes obtaining a first internet protocol (IP) packet, and modifying the first IP packet to form a modified IP packet. Modifying the first IP packet includes adding an extension header to the first IP packet, the extension header including a first source identifier identifying the first device, an indication of a key generation authority, and an indication of a first identity-based cryptographic (IBC) algorithm. The method also includes generating a first identity-based signature (IBS) using the IBC algorithm with the first source identifier as an identity input, the modified IP packet as a message input, and a private IBC key for the first device as a private key input. The modified IP packet and the first IBS are sent from a network interface towards a destination of the first IP packet.

DETAILED DESCRIPTION

Figure 1:
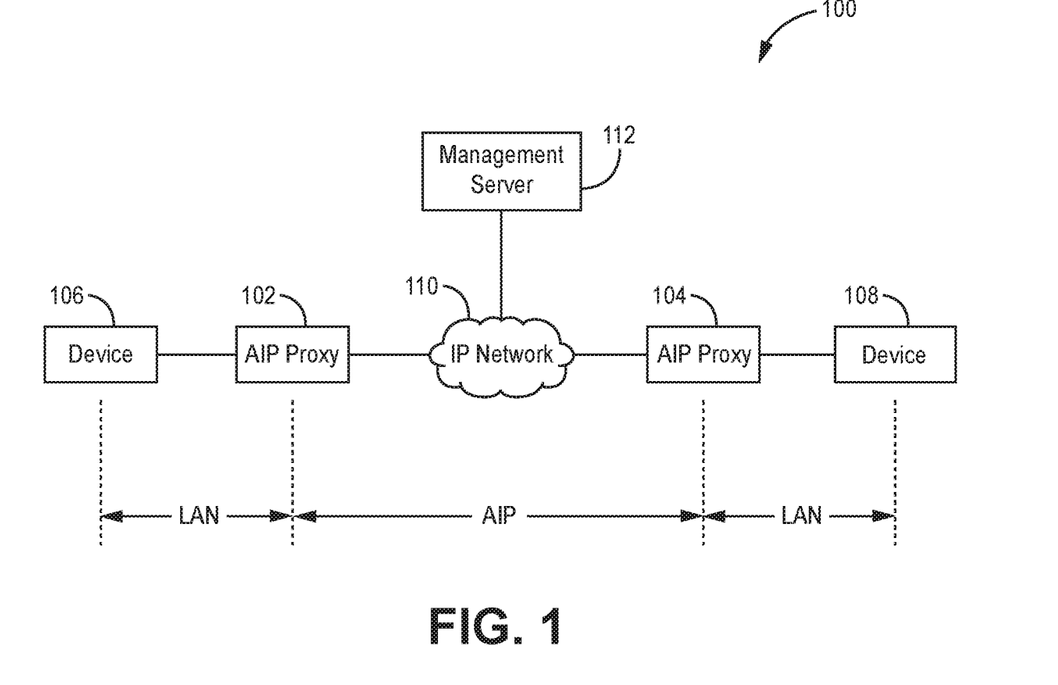
FIG. 1 is a block diagram of an example system including assured internetworking protocol (AIP) performance enhancing proxies (AIP proxies), which provide increased assurance for communications between devices.

FIG. 1 is a block diagram of an example system 100 including assured internetworking protocol (AIP) performance enhancing proxies (AIP proxies) 102, 104, which provide increased assurance for communications between devices 106, 108 over one or more internet protocol (IP) networks 110. Devices 106, 108 can be any end-point device capable of generating and receiving original IP packets for communication with another end-point device over the one or more IP networks 110. Example end-point devices 106, 108 include a personal computing device (e.g., desktop computer, laptop computer, mobile device), server, industrial equipment, or sensor. The one or more IP networks 110 can be any IP network including the Internet and/or a local area network (LAN).

Each AIP proxy 102, 104 protects one or more devices 106, 108 from IP-based network attacks originating in the IP network(s) 110. By mitigating the risk of IP-based network attacks on the protected devices 106, 108, the AIP proxies 102, 104 provide increased assurance for communications between their protected device 106, 108 and another device 108, 106 that is protected by a corresponding AIP proxy 102, 104.

The AIP proxies 102, 104 are configured such that they can be easily added to existing IP networks and provide the network-attack protections to existing devices 106, 108 without requiring modification of those devices 106, 108. The AIP proxies 102, 104 can accomplish such protection without modification of the protected devices 106, 108 by capturing IP packets traveling to and from their protected devices 106, 108 and performing actions on those packets as described herein. No change in the network protocol or communication scheme of the protected devices 106, 108 may be necessary, because the AIP proxies 102, 104 can capture and perform their actions on standard IP packets sent in the normal manner from the protected devices 106, 108.

In the example of FIG. 1, the AIP proxies 102, 104 are implemented in networking devices separate from the devices 106, 108 being protected. In such an example, the protected devices 106, 108 are communicatively coupled to the AIP proxies 102, 104 over one or more network links, such as a wired or wireless local area network (LAN) link. In such an example, the AIP proxy 102, 104 can be implemented in a stand-alone networking device or within a networking device that also implements another networking function, such as a router, gateway, or network switch.

In other examples, one or more of the AIP proxies 102, 104 can be implemented as a "bump-in-the-stack" software module included within the device(s) 106, 108 being protected. In such an example, the AIP proxy 102, 104 is a software module executing in the network stack (e.g., as an AIP shim layer) that can be added to an existing device 106, 108 or implemented in the device as originally manufactured.

Regardless of whether the AIP proxy 102, 104 is implemented in a separate networking device or within the device 106, 108 being protected, the AIP proxies 102, 104 capture, modify, and filter IP packets sent between the devices 106, 108 in order to provide increased assurance for communications between the devices 106, 108. The modification and filtering of packets enables the devices 106, 108 to communicate with one another over potentially insecure IP network(s) 110 with increased assurance. The AIP proxies 102, 104 protect devices 106, 108 behind the AIP proxy 102, 104 from network attacks originating in the IP network(s) 110 on the "front" side of the AIP proxy 102, 104. The AIP proxies 102, 104 protect devices 106, 108 behind them by filtering incoming packets directed toward those devices 106, 108, such that only desired packets are forwarded on toward the devices 106, 108. The AIP proxies 102, 104 operate in pairs. One AIP proxy 102, 104 is positioned near each end of a network communication path for protected devices 106, 108, between those protected devices 106, 108 and the potentially insecure IP network(s) 110 therebetween. This position of the AIP proxies 102, 104 isolates the protected devices 106, 108 from the potentially insecure IP network(s) 110.

FIG. 1 illustrates an example in which two devices 106, 108 communicate with one another through one or more IP networks 110. A first AIP proxy 102 protects a first device 106 from IP-based network attacks originating in the IP network(s) 110 and a second AIP proxy 104 protects a second device 108 from IP-based network attacks originating in the IP network(s) 110. The first AIP proxy 102 operates in cooperation with the second AIP proxy 104 to provide assured communication for packets sent between the first device 106 and the second device 108 through the IP network(s) 110.

One type of attack that IP networks are vulnerable to is a denial of service (DoS) attack. In a denial of service attack, a large number of packets are sent to the same destination or over the same network link at the same time. In such an attack, the number of packets is designed to be so large that the packets consume all the available bandwidth to that destination or on that network link. The result of such an attack is that the DoS packets use up all the available bandwidth and legitimate packets cannot get through. The AIP proxies 102, 104 can mitigate against such an attack by being positioned in front of their protected device 106, 108 or in front of a vulnerable network link to their protected device 106, 108 and filtering out non-approved (e.g., DoS) IP packets.

The AIP proxy 102 is positioned in the network path between the protected device 106 and the IP network(s) 110 from which the protected device 106 is to be isolated. In particular, the AIP proxy 102 is placed in a location on the network path, such that IP packets will not be routed around the AIP proxy 102 between the protected device 106 and the IP network(s) 110 from which the device 106 is being isolated. By placing the AIP proxy 102 in such a location, all IP packets sent between the protected device 106 and the IP network(s) 110 from which the device 106 is being isolated travel through the AIP proxy 102. An example network location for the AIP proxy 102 is immediately in front of the protected device 106, that is, between the protected device 102 and all IP networks. Another example network location for the AIP proxy 102 is between a LAN in which the protected device 106 is included and the IP network(s) 110 from which the device 106 is being isolated.

Each protected device 106, 108 in system 100 can be assigned a globally unique AIP identifier to be used for identifying the device 106, 108 to the AIP proxies 106, 108 in the system 100. The AIP identifier can be any suitable identifier that uniquely identifies the protected device 106, 108. In an example, the AIP proxy 102 protecting a device 106 can generate the AIP identifier for that device 106 if an AIP identifier does not already exist. To generate an AIP identifier, the AIP proxy 102 can obtain the media access control (MAC) address of the device 106 using a protocol supported by the device 106 (e.g., address resolution protocol (ARP)) or neighbor discovery protocol (NDP)). The AIP proxy 102 can then generate the AIP identifier for the device 106 and use the MAC address of the device 106 as part of the AIP identifier. In an example, the AIP identifier can be generated by concatenating the MAC address of the device 106 with another number. In an example, the AIP identifier is a one hundred twenty-eight bit address. In an example, the AIP identifier is an immutable, globally unique identifier for the device 106. Once generated, the AIP identifier can be stored at the AIP proxy 102 for look-up when modifying captured IP packets. If the AIP proxy 102 protects multiple devices, each device can have a distinct AIP identifier.

In an example, the AIP proxies 102, 104 also communicate with a management server 112 that is communicatively coupled to the AIP proxies 102, 104 over one or more IP networks, such as IP network(s) 110 (e.g., the Internet). The management server 112 can provide management information to the AIP proxies 102, 104, and the AIP proxies 102, 104 can provide information to the management server 112. In an example, the management server 112 can maintain a list of protected devices in the system 100 and can maintain information on each of the protected devices. The information on a protected device can include an identifier for the protected device, such as its AIP identifier, IP address, and/or MAC address. In an example, the information on the protected device also includes one or more attributes of the protected device, such as a physical location (e.g., city, site, building), organization (e.g., company controlling the device), company division, type of device (e.g., personal computing device, type of industrial equipment), capabilities of the device, or other attributes. In an example, the information on the protected device includes access rules for the protected device. The access rules define which other protected devices the protected device can communicate with. In an example, the access rules include an access list, which specifically identifies individual devices that the protected device can or cannot communicate with by an identifier (e.g., the AIP identifier). In an example, the access rules include a combination of one or more attributes of devices that the protected device can or cannot communicate with. The management server 112 can provide an admin user interface through which a human administrator can construct the access rules for the protected devices 106, 108. In an example, the information on the device 106 includes an identifier of the AIP proxy 102 protecting the device. The identifier of the AIP proxy 102 can be an IP address for the AIP proxy 102.

The information for a protected device can be maintained by the management server 112 in a device record for the protected device 106, 108. The management server 112 can maintain a device record for each protected device 106, 108 in its system 100. In an example, the device record for a protected device 106 can be generated by the AIP proxy 102 protecting that device 106. The information regarding the device 106 can be manually loaded onto the AIP proxy 102 during set-of or other configuration of the AIP proxy 102. In an example, information regarding each device that the AIP proxy 102 is to protect is manually loaded onto the AIP proxy 102 prior to AIP proxy 102 protecting that device.

To generate the device record for device 106, the AIP proxy 102 can group the information on the device 106 together into a package and sign the package with an identity-based signature (IBS) for the protected device 106. The AIP proxy 102 can then send the signed device record to the management server 112. The management server 112 can verify authenticity of the signature of the signed device record and, if the signature is successfully authenticated, store the signed device record for later retrieval. The management server 112 can accumulate a signed device record for each protected device 106, 108 in the system 100 from the protected devices 106, 108 AIP proxy 102, 104 in this way. The management server 112 can then send out the signed device record for a protected device 106, 108 to another AIP proxy 102, 104 so that the other AIP proxy 102, 104 can obtain authenticated information on the other protected device 106, 108.

An identity-based signature (IBS) is a digital signature that is generated using an identity-based cryptography (IBC) algorithm. The identity-based signature (IBS) for the device record can be generated by the AIP proxy 102 by using the identity-based cryptographic (IBC) algorithm corresponding to the system 100. The IBC algorithm takes a private IBC key and the package of information as an input and generates the IBS. Any suitable IBC algorithm can be used to generate the IBS, and any suitable key generation authority having appropriate securities to protect their master private IBC key can also be used.

The private IBC key used to generate the IBS is a private IBC key issued by the key generation authority for the AIP identifier of the protected device 106 to which the package of information corresponds. After generating an AIP identifier for a protected device 106, the AIP identifier can be sent (e.g., by the AIP proxy 102) to the key generation authority for generation of a private IBC key for the protected device 106. The private IBC key generated by the key generation authority for the protected device 106 will correspond to the protected device's AIP identifier. That is, the AIP identifier for the protected device 106 acts as or can be used to generate the public key pair for the private IBC key generated. Optionally, one or more attributes for the protected device 106 can also be provided to the key generation authority for encoding in the private IBC key. Once the private IBC key for the protected device 106 is obtained by the AIP proxy 102, the private IBC key can be used for generating IBSs on behalf of the protected device 106.

The private IBC key for the protected device 102 can be stored in the AIP proxy 102 protecting that device 102. A distinct private IBC key can be generated (issued) for each protected device based on that device's AIP identifier. Thus, if an AIP proxy 102 is protecting multiple devices, the AIP proxy 102 can store a distinct private IBC key for each such protected device. In any case, the AIP proxy 102 uses the private IBC key for the device 106 corresponding to the device record to generate a valid IBS for that device record.

Figure 2:
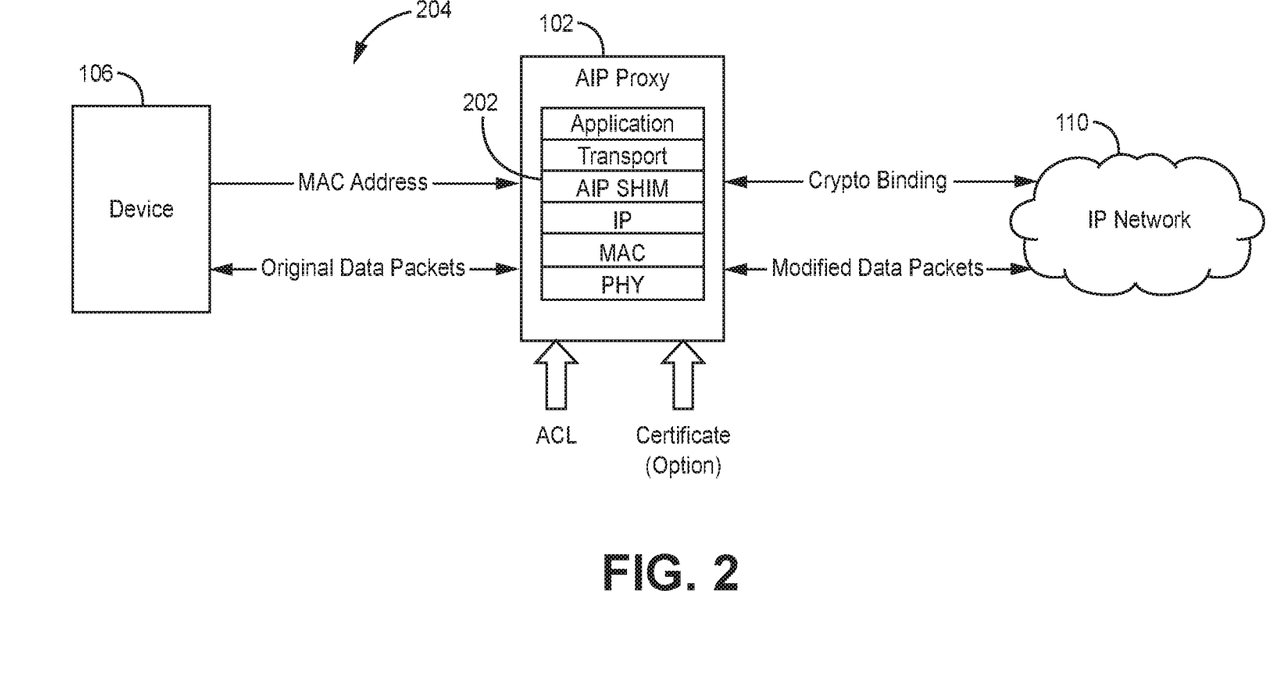
FIG. 2 is a block diagram of an example AIP proxy and the device its protecting from an IP network.

FIG. 2 is a block diagram of an example AIP proxy 102 that operates in a device (e.g., a network appliance) distinct from its protected device 106. The AIP proxy 102 implements a full network stack to send and receive original IP packets with the protected device 106 over one or more network links (204) therebetween.

In an example, the AIP proxy 102 operates transparently to its protected device 106. That is, for outgoing packets, the protected device 106 sends outgoing IP packets as if no AIP proxy 102 were present. For incoming packets, the AIP proxy 102 filters out unwanted incoming packets and allows other IP packets to proceed to the AIP proxy 102. The allowed IP packets are received by the protected device 106 as if no AIP proxy 102 were present. To operate transparently to its protected device 106, the AIP proxy 102 captures the outgoing IP packets from the protected device 106 and modifies them before sending them over the IP network(s) 110 being isolated. The AIP proxy 102 also captures incoming IP packets identifying the protected device 106 as their destination and filters out incoming IP packets that were not sent from a device behind a cooperating AIP proxy 104. Incoming IP packets from a cooperating AIP proxy are not blocked during filtering and are modified back to their original state and forwarded to the protected device 106. An AIP shim layer 202 can be implemented in the network stack of the AIP proxy 102 to perform the assured networking functions (e.g., modifying outgoing packets and filtering incoming packets) as described herein.

AIP proxies 102, 104 filter out unwanted incoming IP packets by verifying that the source of the packet is authorized to communicate with the destination of the packet. The AIP proxy 102, 104 can check the source IP address as well as an AIP identifier of the incoming packet against an access control list to determine if the source of the incoming packet is allowed to communicate with the protected device 106, 108 behind the AIP proxy 102, 104. If the source of the packet is not allowed to communicate with the protected device 106, 108, the AIP proxy 102, 104 discards the packet. Otherwise, the AIP proxy 102, 104 can continue processing the packet to forward the packet to the protected device 106, 108.

Packets carrying non-control data between protected devices 106, 108 can be encrypted using a shared secret key (e.g., a symmetric key) known only to the AIP proxies 102, 104 for those protected devices 106, 108. The protected devices 102, 104 can send and receive plaintext packets and the AIP proxy 102, 104 in front of that protected device 106, 108 can capture outgoing IP packets, add an IP extension header to those packets, encrypt the packets using the shared secret, and forward the modified packet to the IP network(s) for forwarding toward the destination. The AIP proxies 102, 104 can also capture incoming IP packets from sources that are allowed to communicate with the protected device 106, 108, unencrypt the packets, and forward the plaintext version of the packet to the protected device 106, 108.

Figure 3:
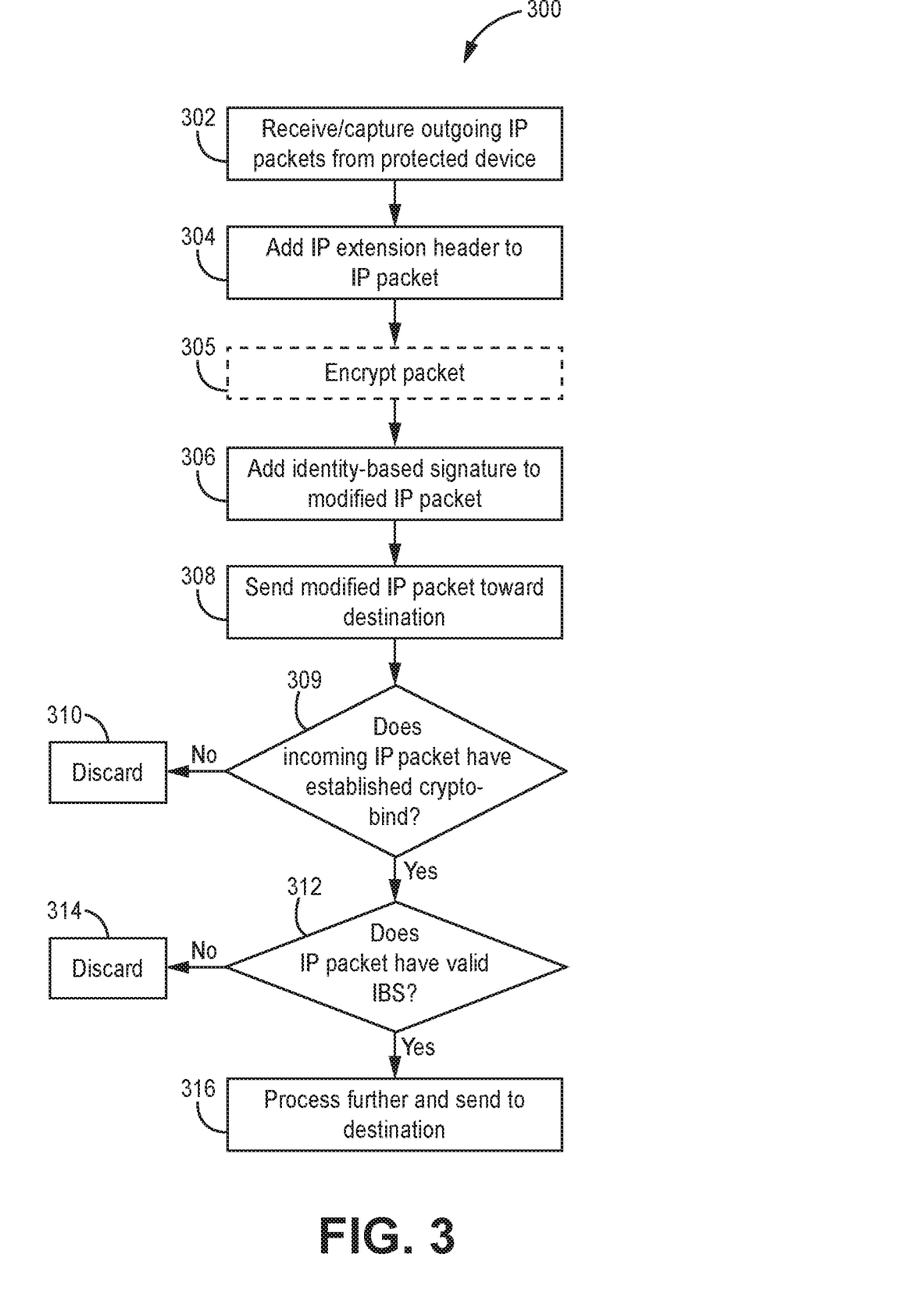
FIG. 3 is a flow diagram of an example method for passing packets between devices using the AIP proxies of FIG. 1.

FIG. 3 is a flow diagram of an example method 300 for passing packets between devices 106, 108 through their respective AIP proxy 102, 104. As mentioned above, each AIP proxy (e.g., 102) cooperates with another AIP proxy (e.g., 104) on the other end of a network communication path to provide increased communication assurance for IP packets sent between protected devices 106, 108 behind the AIP proxies 102, 104. In the example shown in FIG. 1, two AIP proxies 102, 104 cooperate to forward IP packets modified by the other AIP proxy 102, 104 to their protected devices 106, 108, while blocking (filtering out) other IP packets. The modification of each IP packet by an AIP proxy 102, 104 is coordinated so that the AIP proxy 102, 104 on the other end of the established network path will not block the IP packet, allowing the IP packet to reach the destination protected device 106, 108 behind that other AIP proxy 102, 104.

In the example shown in FIG. 1, the AIP proxy 102 and the AIP proxy 104 can cooperate to allow IP packets sent from their respective protected devices 106, 108 to be passed through the AIP proxies 102, 104, and on to their protected devices 106, 108. More specifically, the AIP proxy 102 can cooperate with the AIP proxy 104 to allow IP packets from the device 108 behind the AIP proxy 104 to be passed through the AIP proxy 102 to the device 106. Similarly, the AIP proxy 104 can cooperate with the AIP proxy 102 to allow IP packets from the device 106 behind the AIP proxy 102 to be passed through the AIP proxy 104 to the device 108. While the AIP proxies 102, 104 are allowing such packets from devices 106, 108 to be passed therethrough, the AIP proxies 102, 104 can block other, non-approved IP packets from being passed. By blocking such non-approved IP packets and allowing packets from the device 106, 108, the AIP proxies 102, 104 can mitigate network attacks on the devices 106, 108 while still allowing communication therebetween. This results in an improved assurance of communication between the devices 106, 108 over the IP network(s) 110.

First, an AIP proxy 102 receives an IP packet (block 302). The AIP proxy 102 can then determine whether the packet is an outgoing packet from its protected device 106. The AIP proxy 102 can determine whether the packet is an outgoing packet from its protected device 106 based on the port and/or network interface of the AIP proxy 102 that the IP packet is received on and/or the source identifier (e.g., IP address, MAC address) in the IP packet.

In response to identifying an IP packet from its protected device 106, the AIP proxy 102 can modify the IP packet prior to forwarding the IP packet on towards its destination. Modifying an IP packet includes adding an IP extension header (block 304) to the IP packet, optionally encrypting the packet (block 305), and adding an identity-based signature (IBS) (block 306) to the packet.

Adding the IP extension header (block 304) includes adding an AIP identifier, an indication of the IBC algorithm used to create the IBS for the packet, and an indication of a key generation authority that issued the private IBC key used to create the IBS into an IP extension header of the packet. An IP packet with the above discussed IP extension header added by an AIP proxy 102, 104 is also referred to herein as a "modified IP packet". In the example of a packet sent from device 106 and captured by AIP proxy 102, the AIP identifier would identify the device 106 which generated and sent the packet.

In an example, the standard IP header (i.e., not including any extension IP headers) of the modified IP packet is identical to the standard IP header of the original IP packet received from the protected device 106. In such an example, the destination IP address in the standard IP header is the IP address of the protected device 108 to which the original IP packet was destined. Accordingly, the IP network(s) 110 will route the modified IP packet towards the destination protected device 108.

In an alternative example, the IP address of the AIP proxy 104 in front of the destination protected device 108 is inserted into the destination IP address in the standard IP header of the modified IP packet instead of the IP address of the destination protected device 108. The remaining fields of the standard IP header of the modified IP packet can be the same as their counterpart fields in the standard IP header of the original IP packet captured by the AIP proxy 102 from the protected device 106. In such an example, an identifier (e.g., the AIP identifier) for the destination protected device 108 is inserted into the extension IP header.

The IP address of the destination AIP proxy 104 can be looked-up by the (source) AIP proxy 102. To look-up the IP address of the destination AIP proxy 104, the source AIP proxy 102 can request a device record for the destination protected device 108 from the management server 112. To request a device record, the source AIP proxy 102 can send a device record request to the management server 112 indicating a request for a device record for a device 108 and provide the IP address for that device 108 from the original IP packet captured from its protected device 106.

The management server 112 can receive the request and look-up the device record corresponding to that IP address. The management server 112 can then send the signed device record stored thereon, for the destination protected device 108, to the source AIP proxy 102. In other examples, the device record can be unsigned. The source AIP proxy 102 can verify the authenticity of the signed device record by checking the signature with the AIP identifier of the destination protected device 108. Once the authenticity is verified, the source IP proxy 102 can obtain the identifier for the AIP proxy 104 protecting the destination device 108 from the device record. This identifier can be, or can be used to obtain, the IP address for that AIP proxy 104. The AIP proxy 102 can also look-up the AIP identifier for the protected device from the device record. The signed device record can be stored by the AIP proxy 102 for use again at a later time. Once the IP address of the AIP proxy 104 for the destination device 108 is obtained, the source AIP proxy 102 can insert that IP address into the standard IP header of the modified IP packet.

Replacing the destination IP address in the standard IP header with the IP address of the AIP proxy 104 in front of the destination protected device 108 enables the (destination) AIP proxy 104 to directly receive the modified IP packet without having to intercept the modified IP packet on its way to the destination protected device 108. This can enable a more straightforward set-up of the destination AIP proxy 104. If the modified IP packet has the IP address of the destination protected device 108 in its standard IP header, then the destination AIP proxy 104 should be set-up as a router to intercept (capture) the modified IP packet as they pass therethrough. If the modified IP packet has the IP address of the destination AIP proxy 104 in its standard IP header, then the destination AIP proxy 104 does not need to be set-up as a router, because the modified IP packet will be routed to the destination AIP proxy 104 and can be received as a packet addressed thereto. The source AIP proxy 102 can be manually set to either replace the destination IP address in the standard IP header or not based on a control message from the management server 112. In an example, the control message can instruct the AIP proxy 102 to operate in destination IP replacement or non-replacement mode for all IP packets modified.

In an example, modifying the IP packet can also include encrypting the payload thereof. To encrypt the payload, the AIP proxy 102 looks-up a shared secret (e.g., a symmetric key) corresponding to the destination of the packet. The AIP proxy 102 can maintain a list of all shared secrets for communications between its protected device(s) 106 and other protected devices 108. In an example, each unique pairing of protected devices 106, 108 uses a unique shared secret. The shared secret can be set up by establishing a crypto-binding (method 400 below) between respective AIP proxies 102, 104 for the corresponding protected devices 106, 108. Once the shared secret for communications between the source and destination protected device 106, 108 is identified by the AIP proxy 102, the AIP proxy 102 can encrypt the payload of the packet based on the shared secret (block 306).

The identity-based signature (IBS) for the modified IP packet can be generated by the AIP proxy 102, 104 by using the identity-based cryptographic (IBC) algorithm indicated in the IP extension header (i.e., the IBC algorithm for the system 100). The IBC algorithm takes a private IBC key and an IP packet as an input and generates the IBS. The indication of the IBC algorithm and the key generation authority in the IP extension header can have any suitable format.

The private IBC key used to generate the IBS is a private IBC key issued by the key generation authority for the AIP identifier of the protected device 106 that is the source of the packet. The private IBC key can be look-up by the AIP proxy 102 from its list of private IBC keys and used for generating IBSs for many different IP packets. The list can associate the private IBC key with the IP and/or MAC addresses of its corresponding protected device 106 to enable look-up in response to capturing a packet. The AIP proxy 102 can look-up the private IBC key corresponding to the source identified in the captured IP packet and uses that private IBC key to generate the IBS for the modified version of that captured IP packet.

Using the above modified IP packet and the private IBC key as inputs, the AIP proxy 102, 104 executes the IBC algorithm to create an IBS for the modified IP packet. For the private IBC key the AIP proxy 102, 104 uses the private IBC key corresponding to the source (i.e., the AIP identifier) of the (modified) IP packet. The key generation authority indicated in the IP extension header of the modified IP packet is the key generation authority that issued this private IBC key used to generate the IBS.

The modified IP packet, which includes the IP extension header and payload (optionally encrypted), along with its IBS is then sent from the AIP proxy 102, 104 over the IP network(s) 110 toward the destination protected device 108 (block 308). The IP network(s) 110 attempt to route the modified IP packet to the second device 108 or AIP proxy 104 based on the IP address in the destination address of the standard IP header.

In examples where the destination IP address in the standard IP header of the modified IP packet is the IP address of the AIP proxy 104, the AIP proxy 104 simply receives the modified IP packet and processes further as discussed below.

In examples where the destination IP address in the standard IP header of the modified IP packet is the IP address of the destination protected device 108, the AIP proxy 104 identifies the modified IP packet and captures it before forwarding to the protected device 108. In such examples, since the second AIP proxy 104 is in the network path between the IP network(s) 110 and the second device 108, the modified IP packet is routed to the second AIP proxy 104 on its way to the second device 108.

In either case, in response to receiving an incoming IP packet, the AIP proxy 104 determines whether to block the packet or forward the packet on toward its destination. In an example, the AIP proxy 104 block all IP packets destined for a device 108 protected thereby that do not both have a source having an established crypto binding with the destination protected device 108 and a valid IBS. For example, if an incoming IP packet indicates the second device 108 is its destination, but it is not sent from a device having an established crypto binding with the second device 108 (or another device protected by the AIP proxy 104) or does not have a valid IBS, the AIP proxy 104 discards the incoming IP packet without forwarding the incoming IP packet on toward its destination (e.g., the second device 108). If an incoming IP packet indicates the second device 108 (or another protected device) is its destination, is sent from a device having an established crypto binding with the second device 108 and has a valid IBS, the AIP proxy 104 forwards the incoming IP packet on toward its destination (e.g., the second device 108). The second device 108 then receives the incoming IP packet and processes it. The AIP proxy 104 can determine which protected device is the destination of an incoming IP packet modified to include the AIP proxy's 104 IP address in the destination IP address field, by looking at the appropriate field in the extension IP header which includes an identifier (e.g., the AIP identifier) for the destination protected device 108.

The AIP proxy 104 determines whether the source (e.g., device 106) of an incoming IP packet has an established crypto binding with the destination (e.g., device 108) of the incoming IP packet by comparing the source AIP identifier in the extension header of the packet against a list of established crypto binds (block 309). If the incoming IP packet does not have an extension header or does not have a source AIP identifier, indication of an IBC algorithm, and an indication of a key generation authority in the extension header in the proper format, the AIP proxy 104 discards the incoming IP packet without forwarding it towards it destination (block 310). If the incoming IP packet has an extension header with the above information in the proper format, but the AIP identifier in the extension header does not match any identifiers in the list of established crypto binds, the AIP proxy 104 discards the incoming IP packet without forwarding the IP packet toward its destination (block 310). If the AIP identifier in the extension header does match an identifier in the list of established crypto binds, the AIP proxy 104 process the incoming IP packet further to determine whether the IP packet has a valid IBS (block 312).

To determine whether the incoming IP packet has a valid IBS (block 312), the AIP proxy 104 verifies the validity of any IBS sent with the incoming IP packet using the IBC algorithm identified in the extension header of the incoming IP packet, a IBC master public key from the key generation authority identified in the extension header, the source AIP identifier included in the extension header, and the (modified) IP packet itself. An IBS can be verified by performing a verification process which uses the IBS, the packet to which the IBS corresponds, the IBC master public key, a source identifier for the packet. Since the IBC master public key can be obtained a priori (e.g., offline) from the appropriate key generation authority none of the items necessary to verify the IBS need to be obtained over a network at the time a modified IP packet with an IBS is received. This is advantageous in mitigating the risk of network-based attacks, because the IBS can be verified without relying on the network. That is, once an entity has the IBC master public key, which can be obtained once and used many times thereafter, an IBS signed packet received by that entity contains all the other information necessary to verify the IBS.

If the incoming IP packet either does not have an IBS included therewith, or the IBS included therewith does not properly compute using the information in the extension header, the AIP proxy 104 discards the incoming IP packet without forwarding it on toward the destination (block 314). If the incoming IP packet has an IBS that does properly compute using the information in the extension header, the AIP proxy 104 considers the IBS to be valid and processes the IP packet further for forwarding toward the destination (block 316). Such further processing can include replacing the destination IP address in the standard IP header with the IP address of the destination protected device 108.

In the example of a modified IP packet from the first AIP proxy 102 having the first device 106 as its source and indicating the second device 108 as its destination, the first AIP proxy 102 included a valid IBS when generating the modified IP packet. Accordingly, when the AIP proxy 104 receives the modified IP packet, the AIP proxy 104 determines that the modified IP packet is received from the first device 106. Assuming that the first device 106 has an established crypto bind with the second device 108, the AIP proxy 104 accordingly verifies that the IBS included with the incoming modified IP packet is valid and forwards the modified IP packet on over the one or more IP links toward the second device 108 (block 314).

In examples where the modified IP packet is encrypted, the AIP proxy 104 protecting the destination device 108 has a shared secret with the AIP proxy 102 protecting the source device 106. The AIP proxy 104 protecting the destination device can use the shared secret to unencrypt the payload. The unencrypted payload can then be included as the payload of the IP packet sent to the destination device 108. Encrypting the payload provides privacy for the IP packet in addition to the assured communications. An AIP proxy 102, 104 receiving an incoming IP packet having an encrypted payload, that is received from a device having an established crypto binding with the destination device, and a valid IBS, can unencrypt the payload using the private IBC key of the destination device.

The same method 300 operates in the other direction for an IP packet sent from the second device 108 to the first device 106, except that the AIP proxies 102, 104 switch roles, with the AIP proxy 104 modifying the outgoing IP packet and the AIP proxy 102 determining whether to block or forward the modified IP packet when received.

The AIP proxy 102 and the AIP proxy 104 can repeat the above acts for multiple IP packets sent between the first device 106 and the second device 108 to enable ongoing communication between the two devices 106, 108. Notably, the AIP proxies 102, 104 can repeatedly perform method 300 for IP packets sent in both directions while blocking non-approved incoming packets for their protected devices 106, 108. In an example, the AIP proxies 102, 104 can block all incoming IP packets destined for a device protected thereby that are not received from a device having an established crypto binding or do not have a valid IBS. Thus, AIP proxy 102 would block all incoming IP packets having the first device 106 as their destination that are not received from a device having an established crypto binding with the first device 106 or do not have a valid IBS. AIP proxy 104 would similarly block all incoming IP packets having the second device 108 as their destination that are not received within an established crypto binding and do not have a valid IBS. In such a situation, the AIP proxies 102, 104 also modify all outgoing IP packets from their protected devices 106, 108 that are destined for a device behind the other AIP proxy 102, 104 so that the other AIP proxy 102, 104 will forward the modified IP packets on without blocking them.

Each AIP proxy (e.g., 102, 104) can communicate with the appropriate key generation authority to obtain a private IBC key for each device being protected. The AIP proxies can provide the key generation authority with the AIP identifier (and optionally other attributes) for each device for which a private IBC key is requested. The key generation authority can then provide the private IBC keys for each device to the requesting AIP proxy. In the example provide in FIG. 1, the AIP proxy 102 can obtain and securely store the private IBC key for the first device 106 and the AIP proxy 104 can obtain and securely store the private IBC key for the second device 108.

Figure 4:
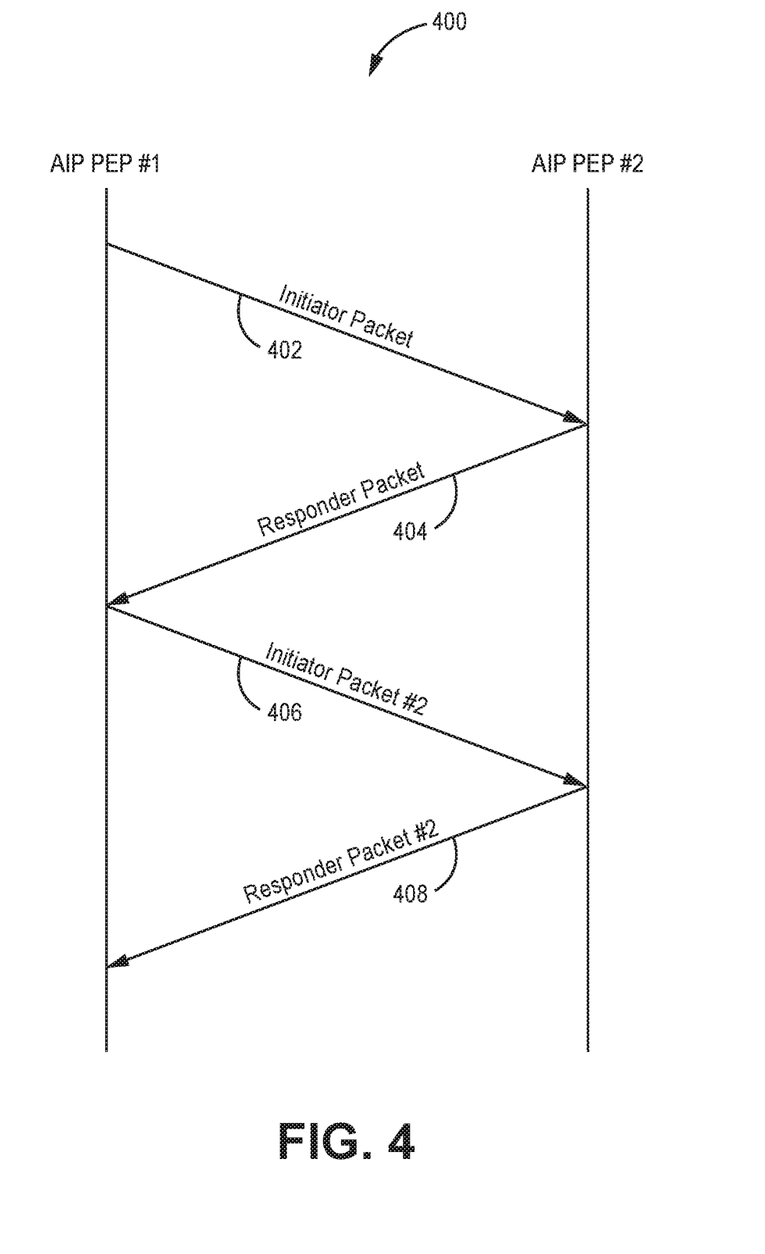
FIG. 4 is a message flow diagram of an example method of setting up a crypto-binding for protected devices by their AIP proxies.

FIG. 4 is a flow diagram of an example method 400 of establishing a cryptographic binding between two devices. Since the AIP proxies 102, 104 are proxies for the devices, the AIP proxies 102, 104 establish cryptographic bindings between two devices 106, 108 protected thereby on behalf of those devices 106, 108. Using the example shown in FIG. 1, the two AIP proxies 102, 104 can establish a cryptographic binding between the first device 106 and the second device 108. In an example, the cryptographic binding is established using a four-packet Diffie-Hellman initiation protocol between the AIP proxy 102 and the AIP proxy 104 with an identity-based signature (IBS).

The initiation protocol can be started by either AIP proxy 102, 104. In this example, the AIP proxy 102 starts the process by sending an initiator packet to the AIP proxy 104 (block 402). The initiator packet is an IP packet routed over the IP network(s) 110 between the AIP proxies 102, 104 that indicates to the receiving AIP proxy 104 that the AIP proxy 102 would like to establish a cryptographic binding on behalf of a device protected thereby (e.g., device 106). The initiator packet can also indicate which device (e.g., device 108) protected by the AIP proxy 104 the crypto binding corresponds to.

The initiator packet indicates to the receiving AIP proxy 104 that it is an initiator packet (e.g., via an appropriate number in an appropriate field) and can include an initiator identifier and a responder identifier. The initiator identifier is the AIP identifier for the protected device 106 behind the sending AIP proxy 102 that the sending AIP proxy 102 is attempting to establish a crypto binding on behalf of. The responder identifier is the AIP identifier for the device 108 behind the receiving AIP proxy 104, with which the crypto binding relationship is being requested. In an example, indications of additional attributes of the initiating device 106 can also be included in the initiator packet. The additional attributes can be any suitable attributes such as a type of equipment to which the initiating device 106 corresponds or a location of the initiating device 106.

In response to receiving the initiator packet, the second AIP proxy 104 can, optionally, verify that the device 106 requesting in the initiator packet is authorized to communicate with the device 108 with which the crypto binding is requested. The second AIP proxy 104 can determine whether the initiating device 106 is authorized based on an access control list. The access control list can be a list of devices and/or attributes thereof that are allowed to communicate with a corresponding protected device. The devices can be indicated on the access control list by their AIP identifiers, for example. Each AIP proxy 102, 104 can maintain an access control list for each device 106, 108 protected thereby.

The devices/attributes in each access control list can be set manually in the AIP proxy 104 or can be set via communication with a remote management server. In an example, the management server can be communicatively coupled to the AIP proxies 102, 104 over one or more IP networks (e.g., the Internet) and management packets sent between the AIP proxies 102, 104 and the management server can be sent using the assured communication method 300 discussed above. The management server can implement a built-in AIP proxy for this. The management packets can provide information the AIP proxies 102, 104 or receive information from the AIP proxies 102, 104.

In any case, the AIP proxy 104 checks the AIP identifier of the initiating device 106 and/or the attributes listed in the initiator packet against its access control list for the device 108 with which a crypt binding is being requested. If the access control list indicates that the initiating device 106 and/or attributes are authorized to communicate with the protected device 108, the AIP proxy 104 generates and sends a responder packet as discussed below. If the access control list indicates that the initiating device 106 is not authorized to communicate with the protected device 108, the AIP proxy 104 discards the initiator packet and discontinues establishing a crypto binding with the AIP proxy 104.

If the initiating device 106 is authorized to communicate with the requested destination device 108, the AIP proxy 104 can respond with a responder packet (block 404). The responder packet is an IP packet that indicates it is a responder packet and can include an initiator identifier and a responder identifier. The initiator identifier and the responder identifier are the same as in the initiator packet being responded to. The responder packet also includes a client puzzle and an identity-based signature (IBS) for the second device 108. The IBS included in the responder packet is to verify that the AIP proxy 104 is in fact authorized to protect the second device 108. The AIP proxy 104 is authorized by receiving a private IBC key for the second device 108 from the appropriate key generation authority. The AIP proxy 104 generates the IBS for the second device 108 by executing the IBC algorithm with the AIP identifier for the second device 108 as the identifier input, the private IBC key for the second device 108 as the private key input, and the responder packet as the message input. The AIP proxy 104 sends the responder packet to the first AIP proxy 102.

In response to receiving the responder packet, the first AIP proxy 102 can verify the IBS signature using the IBC master public key issued by the key generation authority along with the AIP identifier (the responder identifier) for the second device 108 included in the responder packet. If the IBS signature is verified as valid, the first AIP proxy 102 can solve the client puzzle and send a second initiator packet in response to the responder packet (block 406). The second initiator packet is an IP packet indicating that it is a second initiator packet and includes an IBS signature of the first device 106. The second initiator packet can also include the initiator identifier and the responder identifier. The AIP proxy 102 is authorized to protect the device 106, and as such receives the private IBC key for the first device 106 from the appropriate key generation authority. The AIP proxy 102 generates the IBS signature for the second initiator packet by performing the IBE encryption algorithm using the AIP identifier of the first device 106 as the identifier input, the private IBC key of the first device 106 as the private IBC key input, and the second initiator packet as the message input. The AIP proxy 102 also includes the solution to the client puzzle in the second initiator packet. The AIP proxy 102 then sends the second initiator packet to the AIP proxy 104.

In response to receiving the second initiator packet, the second AIP proxy 104 can verify the IBS signature using the IBC master public key issued by the key generation authority along with the AIP identifier for the first device 108 included in the second initiator packet. The second AIP proxy 104 can also verify that the client puzzle solution included in the second initiator packet is correct. If the IBS signature is verified as valid and the client puzzle solution is correct, the second AIP proxy 104 can generate and send a second responder packet to the first AIP proxy 102 (block 408). The second responder packet can be encrypted with a shared secret, portions of which can be exchanged in the responder packet and initiator packet #2 in accordance with the Diffie-Helman exchange. Once a crypto bind is established between two devices, the AIP proxies 102, 104 add those devices to respective lists of established crypto binds on each AIP proxy 102, 104.

In other examples, other initiation protocols can be used to establish a cryptographic binding. In any case, once a cryptographic binding is established between the first device 106 and the second device 108, the first AIP proxy 102 and the second AIP proxy 104 can cooperate to enable assured communication between the first device 106 and the second device 108.

Each AIP proxy 102, 104 can establish a crypto binding on behalf of a given protected device 106, 108 with one or multiple other devices. Each AIP proxy 102, 104 can accordingly modify outgoing and forward incoming IP packets to/from a protected device 106, 108 from/to one or multiple other devices having established crypto bindings.

Figure 5:
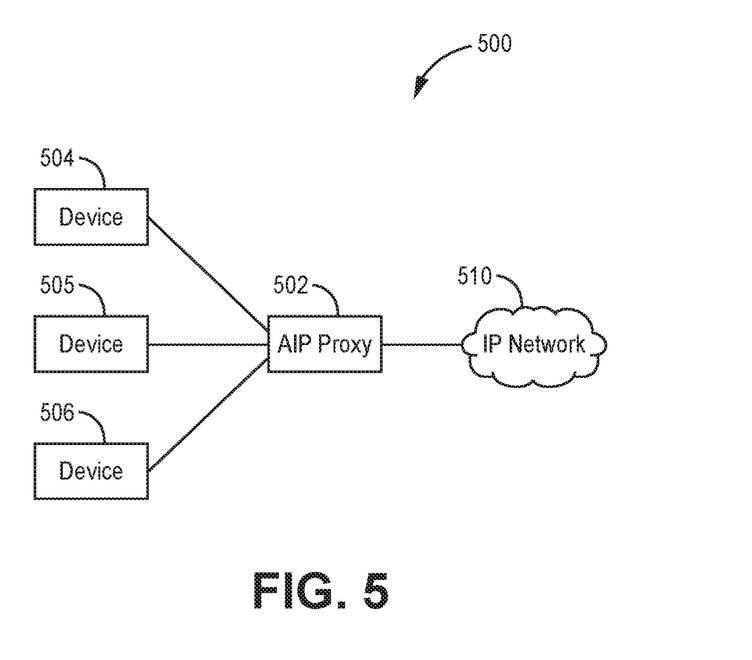
FIG. 5 is a block diagram of an example AIP proxy protecting multiple devices from an IP network.

Each AIP proxy 102, 104 can protect one, or more than one, device 106, 108. In the example shown in FIG. 1, each AIP proxy 102, 104 protects a single device 106, 108. FIG. 5 illustrates an example system 500 illustrating an example AIP proxy 502 protecting multiple devices 504-506. In the example of FIG. 5, the devices 504-506 are communicatively coupled to the AIP proxy 502 over an IP network such as a local area network (LAN).

In examples where an AIP proxy 502 protects multiple devices, the AIP proxy 502 can modify outgoing and filter incoming IP packets to/from the multiple protected devices 504-506. The AIP proxy 502 will modify IP packets from each protected device 504-506 with the AIP identifier and private IBC key corresponding to that device 504-506. Thus, IP packets from different devices 504-506 will be modified to include different identifiers and IBSs generated with different private IBC keys, where the AIP identifiers and private IBC keys used correspond to the source device 504-506 of the IP packet.

The AIP proxy 502 can be positioned between the plurality of devices 504-506 one or more IP networks 510, such as the Internet, from which the plurality of devices 504-506 is to be protected/isolated. In an example, the AIP proxy 502 can protect only a first subset 504, 505 of the plurality of devices 504-506, and a second subset 506 of the plurality of devices 504-506 can remain unprotected. For devices 504, 505 that are protected, the AIP proxy 502 modifies outgoing IP packets therefrom and blocks non-approved incoming IP packets thereto as discussed above. For devices 506 that are not protected, the AIP proxy 502 can forward outgoing IP packets from the unprotected devices 506 on without modification and can refrain from filtering incoming IP packets destined for the unprotected devices 506. Thus, the unprotected devices 506 behind the AIP proxy 502 can communicate with outside devices that are also not protected by an AIP proxy, but the unprotected devices 506 do not receive the protection benefits of the AIP proxy 502. While allowing the unprotected devices to function normally, the AIP proxy 502 can concurrently provide assured communication protections to the protected devices 504-506 as discussed herein.

In an example, an AIP proxy 102 can monitor a length of time in which a device is taken offline. For example, the AIP proxy 102 can monitor a length of time a device protected thereby 106 or a device 108 with which one its protected devices has established a crypto binding is disconnected from the AIP proxy 102. If the length of time of disconnection is longer than a threshold length, the AIP proxy 102 can revoke the device's status as being protected thereby or revoke the devices current crypto binding and/or authorization to communicate on the AIP proxies 102 access control lists. By revoking the device's status in any of these ways, the AIP proxy 102 requires a user to manually re-set the device's status or for the status to be reset via the management server before the AIP proxy 102 will allow packets to/from that device to be passed therethrough. This revocation protects against a protected device 106 being taken down, compromised, and then brought back up and reconnected to the network in order to gain access to another protected device 108.

The management server can establish a cryptographic binding with the AIP proxies 102, 104, such that IP packets sent between the management server and the AIP proxies 102, 104 can include IBSs mitigating the risk of spoofing of such messages. The management server can include a user interface allowing a user to interact with the management server to input commands and obtain information. Multiple different AIP proxy systems can be implemented. Each AIP proxy system can be independently controlled by a respective management server.

What is claimed is:

1. A networking device comprising:
   one or more device side network interfaces;
   one or more network side network interfaces;
   one or more processing devices coupled to the one or more device side network interfaces and the one or more network side network interfaces;
   a private identity-based cryptographic (IBC) key issued for a first device by a key generation authority, the IBC key accessible to the one or more processing devices; and
   storage media coupled to the one or more processing devices, the storage media including instructions which, when executed by the one or more processing devices, cause the one or more processing devices to:
   receive, at a first device side network interface of the one or more device side network interfaces, an internet protocol (IP) packet from the first device;
   modify the IP packet to form a modified IP packet, wherein modify the IP packet includes add an extension header to the IP packet, the extension header including a source identifier identifying the first device, an indication of the key generation authority, and an indication of an identity-based encryption (IBE) algorithm;
   generate an identity-based signature (IBS) using the IBC algorithm with the source identifier as an identity input, the modified IP packet as a message input, and the private IBC key for the first device as a private key input; and
   send the modified IP packet and the IBS from at least one of the one or more network side network interfaces towards a destination of the IP packet.

2. The networking device of claim 1, wherein the source identifier is an immutable, globally unique identifier.

3. The networking device of claim 1, wherein modify the IP packet includes encrypt a payload of the IP packet using the IBC algorithm with the private IBC key as a private key input.

4. The networking device of claim 1, wherein the private IBC key is not exportable.

5. The networking device of claim 1, wherein the modified IP packet is sent over an IP network towards the destination.

6. The networking device of claim 1, wherein the instructions cause the one or more processing devices to:
   repeat the acts of receive, modify, generate, and send to modify multiple IP packets from the first device indicating a second device as a destination to include an extension header and an IBS whereby the first device can communicate with the second device that is protected by a IBS checking module via the modified IP packets.

7. The networking device of claim 6, wherein the instructions cause the one or more processing devices to perform the acts of receive, modify, generate, and send for all IP packets from the first device that are sent to the second device.

8. A networking device comprising:
   one or more device side network interfaces;
   one or more network side network interfaces;
   one or more processing devices coupled to the one or more device side network interfaces and the one or more network side network interfaces; and
   storage media coupled to the one or more processing devices, the storage media including instructions which, when executed by the one or more processing devices, cause the one or more processing devices to:
   receive an internet protocol (IP) packet at a first network side network interface of the one or more network side network interfaces, the IP packet indicating a second device as a destination;
   determine whether the IP packet has a valid identity-based signature (IBS) by determining if an IBS included with the IP packet corresponds to a source identifier, an indication of a key generation authority, and an indication of an identity-based cryptographic (IBC) algorithm included in an extension header of the IP packet;
   if the IP packet does not have a valid IBS, discard the IP packet; and if the IP packet has a valid IBS, process the IP packet for forwarding to the second device.

9. The networking device of claim 8, wherein the instructions cause the one or more processing devices to:
determine whether the IP packet has an extension header including the source identifier fora source device, an indication of the key generation authority, and an indication of the IBC algorithm;
if the IP packet does not have the extension header, discard the IP packet; and
if the IP packet does have the extension header, determine whether the IP packet has a valid IBS.

10. The networking device of claim 8, wherein the instructions cause the one or more processing devices to:
if the IP packet meets all criteria for forwarding to the second device, send the IP packet from a first device side network interface toward the second device.

11. The networking device of claim 8, wherein the instructions cause the one or more processing devices to:
repeat the acts of receive, determine a valid IBS, discard, and process to filter out IP packets without valid IBSs that are destined for the second device.

12. The networking device of claim 11, wherein the instructions cause the one or more processing devices to:
filter out all IP packets destined for the second device without valid IBSs.

13. A method for authenticated communication, the method comprising:
obtaining a first internet protocol (IP) packet;
modifying the first IP packet to form a modified IP packet, wherein modifying the first IP packet includes add an extension header to the first IP packet, the extension header including a first source identifier identifying the first device, an indication of a key generation authority, and an indication of a first identity-based cryptographic (IBC) algorithm;
generating a first identity-based signature (IBS) using the IBC algorithm with the first source identifier as an identity input, the modified IP packet as a message input, and a private IBC key for the first device as a private key input; and
sending the modified IP packet and the first IBS from a network interface towards a destination of the first IP packet.

14. The method of claim 13, wherein the first source identifier and the second source identifier are respective immutable, globally unique identifiers.

15. The method of claim 13, wherein modifying the first IP packet includes encrypting a payload of the first IP packet using the first IBC algorithm with the private IBC key as a private key input.

16. The method of claim 13, wherein the private IBC key is not exportable.

17. The method of claim 13, comprising:
sending the first IP packet over an IP network towards the destination.

18. The method of claim 13, comprising:
repeating the acts of receiving, modifying, generating, and sending to modify multiple outgoing IP packets from the first device indicating a second device as a destination to include an extension header and an IBS whereby the first device can communicate with the second device that is protected by a IBS checking module via the modified IP packets.

19. The method of claim 13, comprising:
performing the acts of receiving, modifying, generating, and sending for all IP packets from the first device that are sent to the second device.

20. The method of claim 13, comprising:
receiving a second IP packet, the second IP packet indicating the first device as a destination;
determining whether the second IP packet has a valid IBS by determining if a second IBS included with the second IP packet corresponds to a second source identifier, an indication of a key generation authority, and an indication of a second IBC algorithm included in an extension header of the second IP packet;
if the second IP packet does not have a valid IBS, discarding the second IP packet; and
if the second IP packet has a valid IBS, processing the second IP packet for forwarding to the first device.

21. The method of claim 20, comprising:
if the second IP packet meets all criteria for forwarding to the second device, sending the IP packet from a first device side network interface toward the second device.

22. The method of claim 20, comprising:
repeating the acts of receiving, determining a valid IBS, discarding, and processing to filter out IP packets without valid IBSs that are destined for the second device.

23. The method of claim 22, comprising:
filtering out all IP packets destined for the second device without valid IBSs.

* * * * *